(12) United States Patent
Yanovski et al.

(10) Patent No.: US 7,215,341 B2
(45) Date of Patent: May 8, 2007

(54) MEMORY FREE METHOD OF REGION FILLING

(75) Inventors: Vladimi Yanovski, Haifa (IL); Alfred M. Bruckstein, Haifa (IL); Israel A. Wagner, Haifa (IL)

(73) Assignee: Technion Research & Development Foundation Ltd., Haifa (IL)

( * ) Notice: Subject to any disclaimer, the term of this patent is extended or adjusted under 35 U.S.C. 154(b) by 533 days.

(21) Appl. No.: 10/468,405

(22) PCT Filed: Mar. 14, 2002

(86) PCT No.: PCT/IL02/00209

§ 371 (c)(1),
(2), (4) Date: Mar. 12, 2004

(87) PCT Pub. No.: WO02/073948

PCT Pub. Date: Sep. 19, 2002

(65) Prior Publication Data

US 2004/0135792 A1    Jul. 15, 2004

(51) Int. Cl.
*G09G 5/00* (2006.01)
*G09G 5/02* (2006.01)
*G02F 11/333* (2006.01)
*G02F 11/36* (2006.01)
*G02F 1/1347* (2006.01)

(52) U.S. Cl. .................. 345/589; 345/593; 345/22; 345/88; 349/78; 349/84

(58) Field of Classification Search ............. 345/428, 345/581, 589, 593, 597, 600, 690, 698, 22, 345/63, 88; 382/162, 167; 349/78–80, 83, 349/84, 97
See application file for complete search history.

(56) References Cited

U.S. PATENT DOCUMENTS

2004/0135792 A1    7/2004   Yanovski et al.

FOREIGN PATENT DOCUMENTS

WO    WO 2002/073948    9/2002

OTHER PUBLICATIONS

Miyamoto et al., Dynamic color allocation method for color-mapped displays, IEEE 1997, pp. 85-92.*
Lane et al. "An Algorithm for Filling Regions on Graphics Display Devices", ACM Transactions on Graphics, 2(3): 192-196, 1983.

(Continued)

*Primary Examiner*—Wesner Sajous

(57) ABSTRACT

A method of coloring a plurality of cells using a predetermined fill-color, the cells occupying a region in a grid of cells thereby defining a plurality of region-cells, the method comprising: (a) dividing the grid into a plurality of elementary-regions, each comprising at least one cell; (b) visiting one elementary-region at a time and determining, for each cell of the elementary-region, whether the cell is a region-cell; (c) writing color data in at least one region-cell of each elementary-region using a color selected from a color-space so as to store information in the elementary-region, the information directing a backtracking path in the region, thereby providing a mapped elementary-region; and (d) using the information for visiting all the mapped elementary-regions along the backtracking path and for writing color data using the fill-color in each region-cell of each of the mapped elementary-region along the backtracking path; thereby coloring all the region-cells by the fill-color.

81 Claims, 5 Drawing Sheets

OTHER PUBLICATIONS

Shani "Filling Regions in Binary Raster Images: A Graph-Theoretic Approach", ACM, 1980.

Yanovski et al. "Zero-Space Grid Cleaning and Region Filling", Computer Science Department, TECHNION, 2002.

Burtsev et al. "An Efficient Flood-Filling Algorithm", Comput & Graphics, 17(5): 549-561, 1993.

Heath et al. "Boundary-Fill Algorithm", Computer Graphics, 2nd Ed., p. 127-130.

Foley et al. "Filling Algorithms", Computer Graphics, Principles and Practices, 2nd Ed., p. 979-982.

* cited by examiner

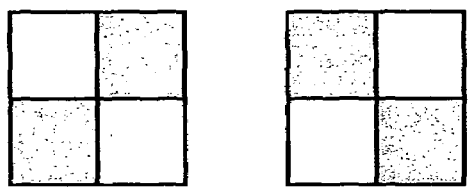
Fig. 5
An example of the run of the fill algorithm for a 4-connected region
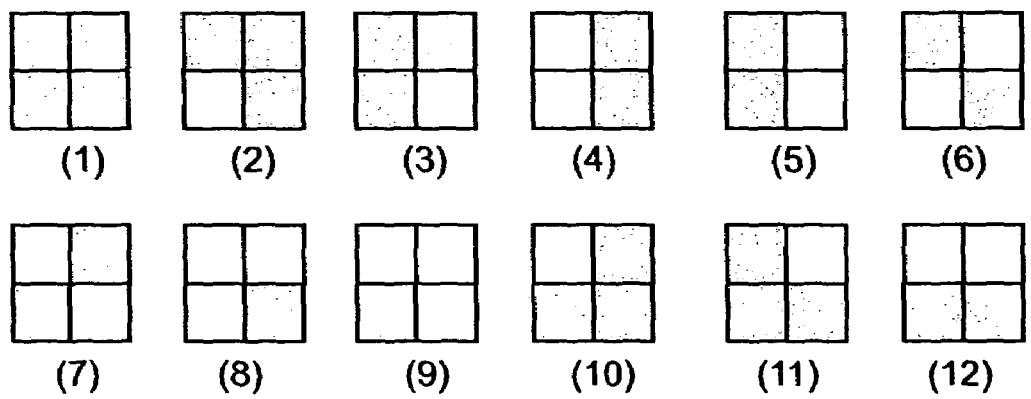
Fig. 6
Fig. 7
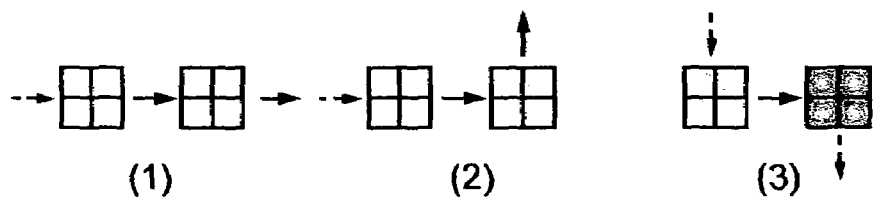
Fig. 8

States of the meta-tile when the meta-agent must backtrack to the left

MEMORY FREE METHOD OF REGION FILLING

FIELD AND BACKGROUND OF THE INVENTION

The present invention relates to a method of region filling and, more particularly, to a method of coloring a region of a frame buffer memory without the need to use any additional memory.

Graphic displays mapping frame-buffer memories are used in a wide range of fields such as the graphic user interface of computers. A color object which is displayed in such fields is formed from a plurality of picture elements or pixels each storing a single color. These color objects frequently include one or more filled regions. Examples of filled regions vary from simple shapes such as circles, ellipses and polygons, to more complicated planar regions resulting from projections or cuts of three dimensional bodies, which often includes one or more sub-regions of different colors ("holes").

Many flood filling methods are known in the art and used in computer graphic applications as software routines, running on special purpose hardware devices that are called to perform certain graphic tasks including filling regions. These tasks are supplied in a library containing graphical functions that are typically delivered with a processing system so that users can write to displays with a higher level interface without having to know the complexity of any particular display and how to write to that display.

All known methods for filling a region require additional memory space (a stack) to be dedicated for the method, while performing the filling operation. The extra memory is used for "book-keeping" of the decisions which have been performed, so as to fill the entire region. For example, if at a certain step of the method a complete row of pixels have been processed (say, row number 10), and a decision has been made to move to a row above that row (row number 11), this decision must now be stored in the memory, so that in some later step the row below (row number 9) will be visited.

For an arbitrary region to be filled, the amount of memory that these methods require is not negligible, and it is comparable to the amount of memory used to store the region, i.e. it is proportional to the number of pixels in the region. To address this drawback, methods to reduce the stack size requirement, such as "pixel span approaches" have been suggested. For example, in an article entitled "An Efficient Flood-Filling Algorithm" written by S. V. Burtsev and Ye. R. Kuzmin, and published in 1993 in *Computers & Graphics*, (volume 17(5), pages 549–561), the authors provide a review of known filling algorithms and present a new boundary filling algorithm that requires space which is proportional to the horizontal dimension of the box containing the region. Other methods can be found e.g. in [D. Hearn, M. Pauline Baker, "Computer Graphics", Second Edition, Prentice Hall, 1994; Foley, van Dam, Feiner, Hughes, "Computer Graphics", Second Edition in C, Addison Wesley, 1996].

In some computerized systems, an additional memory may not be available for performing the filling operation, hence the number of machines capable of performing these operations is limited. A typical industrial solution to a memory problem is to temporarily use external devices, such as hard drives and the like, to extend the available memory. However these solutions are slow and inefficient. An algorithm becomes unduly time consuming when users of graphical applications have to wait after they have selected the fill routine from a graphics library before the display screen displays the resulting filled region. It is important for customer satisfaction that the fill method is both fast and economic in terms of hardware requirement, without trading off the accuracy of the filled region.

There is thus a widely recognized need for, and it would be highly advantageous to have, a memory-free method of region filling devoid of the above limitation.

SUMMARY OF THE INVENTION

According to one aspect of the present invention there is provided a method of coloring a plurality of cells using a predetermined fill-color, the cells occupying a region in a grid of cells thereby defining a plurality of region-cells, the method comprising:

(a) dividing the grid into a plurality of elementary-regions, each comprising at least one cell;

(b) visiting one elementary-region at a time and determining, for each cell of the elementary-region, whether the cell is a region-cell;

(c) writing color data in at least one region-cell of each elementary-region using a color selected from a color-space so as to store information in the elementary-region, the information directing a backtracking path in the region, thereby providing a mapped elementary-region; and (d) using the information for visiting all the mapped elementary-regions along the backtracking path and for writing color data using the fill-color in each region-cell of each mapped elementary-region along the backtracking path; thereby coloring all the region-cells with the fill-color.

According to further features in preferred embodiments of the invention described below, each elementary-region comprises a single cell.

According to still further features in the described preferred embodiments all the elementary-regions comprise an equivalent topology.

According to still further features in the described preferred embodiments the method further comprising temporarily storing directional information upon the visiting.

According to still further features in the described preferred embodiments the method further comprising setting a color having a zero color-index equal to the region-color.

According to still further features in the described preferred embodiments the method further comprising setting a color having a maximal value color-index equal to the fill-color.

According to still further features in the described preferred embodiments step (c) comprises selecting a halting-color and writing the halting-color into a single cell, the single cell being a starting cell.

According to still further features in the described preferred embodiments selecting a halting-color comprising setting the halting-color equal to the region-color.

According to still further features in the described preferred embodiments step (c) comprises writing a color other than the region-color into at least one cell neighboring the starting cell, thereby providing at least one sealed cell.

According to still further features in the described preferred embodiments the method further comprising storing a relative direction of each sealed cell with respect to the starting cell.

According to still further features in the described preferred embodiments step (b) comprises, for each elementary-region, visiting all elementary-regions neighboring the elementary-region in a predetermined order.

According to still further features in the described preferred embodiments step (c) comprises determining an existing color-index of each elementary-region and increasing by 1 the existing color-index prior to exiting from the elementary-region.

According to still further features in the described preferred embodiments the color selected from the color-space comprises: a color 0, a color 1, a color 2, a color 3, a halting-color and the region-color.

According to still further features in the described preferred embodiments color 0 is equal to the region-color.

According to still further features in the described preferred embodiments color 3 is equal to the fill-color.

According to still further features in the described preferred embodiments step (c) comprises: writing color 0 prior to exiting the elementary-region from a first direction; writing color 1 prior to exiting elementary-region from a second direction; writing color 2 prior to exiting elementary-region from a third direction; and writing color 3 prior to exiting elementary-region from a fourth direction.

According to still further features in the described preferred embodiments step (c) comprises writing the halting-color into a single cell, the single cell being a starting cell.

According to still further features in the described preferred embodiments step (c) comprises selecting an information color and writing the information color data into at least one cell in the elementary-region, prior to exiting from the elementary-region, the at least one cell being chosen so as to mark an entry-exit direction.

According to still further features in the described preferred embodiments the information color is represented by a color-index ranging from 0 to 5.

According to still further features in the described preferred embodiments a color index 6 corresponds to the boundary-color and further wherein a color index 7 corresponds to the fill-color.

According to still further features in the described preferred embodiments the method further comprising characterizing each elementary-region by an entry axis and a flip symmetry with respect to the entry axis.

According to still further features in the described preferred embodiments the method further comprising, for each elementary-region, selecting an information color in accordance with both of the entry axis and the flip symmetry.

According to still further features in the described preferred embodiments step (c) comprises selecting a halting-color and writing the halting-color into all cells occupying a predetermined elementary-region, the predetermined elementary-region being a starting elementary-region.

According to still further features in the described preferred embodiments the halting-color is equal to the boundary-color.

According to another aspect of the present invention there is provided an apparatus for coloring a plurality of cells using a predetermined fill-color, the cells occupying a region in a grid of cells, thereby defining a plurality of region-cells, the apparatus comprising: (a) a dividing unit, for dividing the grid into a plurality of elementary-regions, each comprising at least one cell; and (b) an agent capable of moving from one elementary-region to another, the agent comprising: (i) means for determining, for each cell of the elementary-region, whether the cell is a region-cell; (ii) a mapping unit for writing color data in each cell of the elementary-region using a color selected from a color-space so as to store information in the elementary-region, the information directing a backtracking path in the region; and (iii) a filling unit for writing color data in each cell of the elementary-region using the fill-color, while backtracking of the agent along the backtracking path.

According to further features in preferred embodiments of the invention described below, the color-space comprises at least four colors.

According to still further features in the described preferred embodiments all region-cells are initially colored by a region-color.

According to still further features in the described preferred embodiments all region-cells are initially colored by a color other than a boundary-color.

According to still further features in the described preferred embodiments the connected region is selected from the group consisting of a 4-connected region and an 8-connected region.

According to still further features in the described preferred embodiments the agent further comprises a memory having a predetermined size, independent of a size of the grid.

According to still further features in the described preferred embodiments the apparatus further comprising a graph constructor, for constructing a graph having a plurality of vertices and a plurality of edges, each vertex corresponding to a single elementary-region, and each edge connecting two the vertices, thereby providing, for each edge, a pair of connected vertices.

According to still further features in the described preferred embodiments the pair of connected vertices respectively correspond to two 8-connected elementary-regions.

According to still further features in the described preferred embodiments the apparatus further comprising a first color setter for setting a color having a zero color-index equal to the region-color.

According to still further features in the described preferred embodiments the apparatus further comprising a second color setter for setting a color having a maximal value color-index equal to the fill-color.

According to still further features in the described preferred embodiments the mapping unit further comprises a first halting mechanism for writing a predetermined halting-color into a single cell, the single cell being a starting cell.

According to still further features in the described preferred embodiments the predetermined halting-color is equal to the region-color.

According to still further features in the described preferred embodiments the mapping unit further comprises a cell sealer for writing a color other than the region-color into at least one cell neighboring the starting cell, thereby to provide at least one sealed cell.

According to still further features in the described preferred embodiments the agent further comprises a memory for storing a relative direction of each sealed cell with respect to the starting cell.

According to still further features in the described preferred embodiments the means for determining comprises a color detector for determining an existing color-index of each elementary-region.

According to still further features in the described preferred embodiments the mapping unit further comprises an electronic-calculating functionality for increasing by 1 the existing color-index prior to exiting of the agent from the elementary-region.

According to still further features in the described preferred embodiments the color selected from the color-space comprises a color having an integer valued color-index, the integer value ranging from 0 to a maximal value.

According to still further features in the described preferred embodiments the maximal value is smaller by one than a size of the color-space.

According to still further features in the described preferred embodiments the filling unit further comprises a characterizer, for characterizing each elementary-region by an entry axis and a flip symmetry with respect to the entry axis.

According to still further features in the described preferred embodiments the mapping unit further comprises a second color selector for selecting an information color, in accordance with both the entry axis and the flip symmetry.

According to still further features in the described preferred embodiments the mapping unit further comprises a cell selector for selecting at least one cell for storing the information color data thereby to mark an entry-exit direction.

According to still further features in the described preferred embodiments the mapping unit further comprises a second halting mechanism for writing a predetermined halting-color into all cells occupying a predetermined elementary-region, the predetermined elementary-region being a starting elementary-region.

According to still further features in the described preferred embodiments the predetermined halting-color is equal to the boundary-color.

According to yet another aspect of the present invention there is provided a method of cleaning a plurality of cells, the cells occupying a region in a grid of cells, thereby defining a plurality of region-cells, the method comprising:

(a) dividing the grid into a plurality of elementary-regions, each comprising a plurality of cells;

(b) for each elementary-region, determining, for at least one the cell of the elementary-region, whether the cell is a region-cell, and if so then cleaning at least one of the region-cells so as to store information in the elementary-region, the information directing a backtracking path in the region; and (c) using the information for visiting all elementary-region along the backtracking path and for cleaning region-cells of each elementary-region along the backtracking path; thereby cleaning all region-cells.

According to further features in preferred embodiments of the invention described below, all the elementary-regions comprise substantially equivalent topology.

According to still further features in the described preferred embodiments all the elementary-regions are of substantially equal sizes.

According to still further features in the described preferred embodiments each elementary-region forms an n by n square where n is an integer other than 1.

According to still further features in the described preferred embodiments step (b) further comprising temporarily storing directional information, prior to entering an elementary-region.

According to still further features in the described preferred embodiments the method further comprising constructing a graph having a plurality of vertices and a plurality of edges, each vertex corresponding to a single elementary-region, and each edge connecting two the vertices, thereby providing, for each edge, a pair of connected vertices.

According to still further features in the described preferred embodiments the pair of connected vertices respectively corresponds to two 4-connected elementary-regions.

According to still further features in the described preferred embodiments each elementary-region forms a 2 by 2 square of cells.

According to still further features in the described preferred embodiments step (b) comprising: determining an entry direction for each elementary-region, thereby defining a father elementary-region, the father elementary-region being located opposite to the entry direction; and cleaning at least one cell adjacent to the father elementary-region.

According to still further features in the described preferred embodiments step (c) comprises determining a pattern of clean cells, thereby defining an exit direction for each elementary-region, the exit direction indicating the father elementary-region.

According to still further features in the described preferred embodiments the pattern comprises clean cells adjacent to the father elementary-region.

According to still further features in the described preferred embodiments step (b) comprises selecting a starting elementary-region.

According to still further features in the described preferred embodiments the method further comprising cleaning all region-cells of the starting elementary-region.

According to still another aspect of the present invention there is provided an apparatus for cleaning a plurality of cells, the cells occupying a region in a grid of cells, thereby defining a plurality of region-cells, the apparatus comprising:

(a) a dividing unit, for dividing the grid into a plurality of elementary-regions, each comprising a plurality of cells; and (b) an agent capable of moving from one elementary-region to another, the agent comprising:

(i) means for determining, for at least one the cell of each elementary-region, whether the cell is a region-cell;

(ii) a mapping unit for storing information in the elementary-region, the information directing a backtracking path in the region; and (iii) a cleaning unit for cleaning the region-cells of the elementary-region, while backtracking of the agent along the backtracking path.

According to further features in preferred embodiments of the invention described below, the information comprises clean cells and non clean cells.

According to still further features in the described preferred embodiments the grid is a regular grid.

According to still further features in the described preferred embodiments the grid is a two dimensional grid.

According to still further features in the described preferred embodiments the grid is selected from the group consisting of a triangular grid, a rectangle grid and a hexagonal grid.

According to still further features in the described preferred embodiments the dividing unit comprises a joining unit for forming a plurality of n by n squares of cells, where n is an integer other than 1, thereby to provide the plurality of elementary-regions, each comprising a single the square of cells.

According to still further features in the described preferred embodiments the agent further comprising a memory having a predetermined size, independent of a size of the grid.

According to still further features in the described preferred embodiments the apparatus further comprising a graph constructor for constructing a graph having a plurality of vertices and a plurality of edges, each vertex corresponding to a single elementary-region, and each edge connecting two the vertices.

According to still further features in the described preferred embodiments the pair of connected vertices respectively correspond to two 4-connected elementary-regions.

According to still further features in the described preferred embodiments the dividing unit comprises a joining unit for forming a plurality of 2 by 2 squares of cells, thereby to provide the plurality of elementary-regions, each comprising a single the square of cells.

According to still further features in the described preferred embodiments the mapping unit comprises a first cleaner for cleaning at least one cell adjacent to a father elementary-region, the father elementary-region being located opposite to a motion direction of the agent.

According to an additional aspect of the present invention there is provided a robot control apparatus for controlling a robot movable inside a predetermined region, characterized by a plurality of region-cells, the robot being capable of operating on the region-cells, the apparatus comprising:

(a) a dividing unit, for dividing the region into a plurality of elementary-regions, each comprising a plurality of region-cells;

(b) a mapping unit, operable to communicate with the robot, for instructing the robot to store information in the elementary-region, the information directing a backtracking path of the robot; and (c) a directing unit operable to communicate with the robot, for sending directional instructions to the robot.

According to further features in preferred embodiments of the invention described below, the operating is selected from the group consisting of: cleaning, painting, polishing and searching.

According to still further features in the described preferred embodiments the information comprises processed region-cells and non-processed region-cells.

According to still further features in the described preferred embodiments the information comprises clean region-cells and non-clean region-cells.

According to still further features in the described preferred embodiments the region is a closed region.

According to still further features in the described preferred embodiments the region is a connected region.

According to still further features in the described preferred embodiments the region is selected from the group consisting of a simply-connected region and a non-simply connected region.

According to still further features in the described preferred embodiments the dividing unit comprises a joining unit for providing a plurality of n by n squares of cells, where n is an integer other than 1, thereby to provide the plurality of elementary-regions, each comprising a single the square of cells.

According to still further features in the described preferred embodiments the squares of cells comprises at least one region-cell.

According to still further features in the described preferred embodiments the directing unit comprises a memory having a predetermined size, independent of a size of the region.

According to still further features in the described preferred embodiments the region is a 4-connected region.

According to still further features in the described preferred embodiments the dividing unit comprises a joining unit for providing a plurality of 2 by 2 squares of cells, thereby to provide the plurality of elementary-regions, each comprising a single the square of cells.

According to still further features in the described preferred embodiments the square of cells comprises at least one region-cell.

According to still further features in the described preferred embodiments the mapping unit comprises a first cleaner for cleaning at least one region-cell adjacent to a father elementary-region, the father elementary-region being located opposite to a motion direction of the robot.

According to still further features in the described preferred embodiments the dividing unit comprises an elementary-region selector for selecting a starting elementary-region.

According to still further features in the described preferred embodiments the starting elementary-region comprises at least two region-cells.

According to still further features in the described preferred embodiments the mapping unit comprises a second cleaner for cleaning all region-cells of the starting elementary-region.

The present invention successfully addresses the shortcomings of the presently known configurations by providing a method and apparatus for region filling far exceeding prior art.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 5 is a motion of the agent on a 4-connected region, according to an embodiment of the present invention;

FIG. 6 is two types of elementary-regions having 2×2 cells, according to an embodiment of the present invention;

FIG. 7 is a summary of all possible configurations of an elementary-region first visited from below;

FIG. 8 is a summary of the backtracking rules for a region defined by a boundary;

DESCRIPTION OF THE PREFERRED EMBODIMENTS

The present invention is of a method and apparatus for region filling which can be used for graphics displays. Specifically, the present invention can be used to fill regions of a graphic display, without a need to allocate additional memory while filling.

Figure 1:
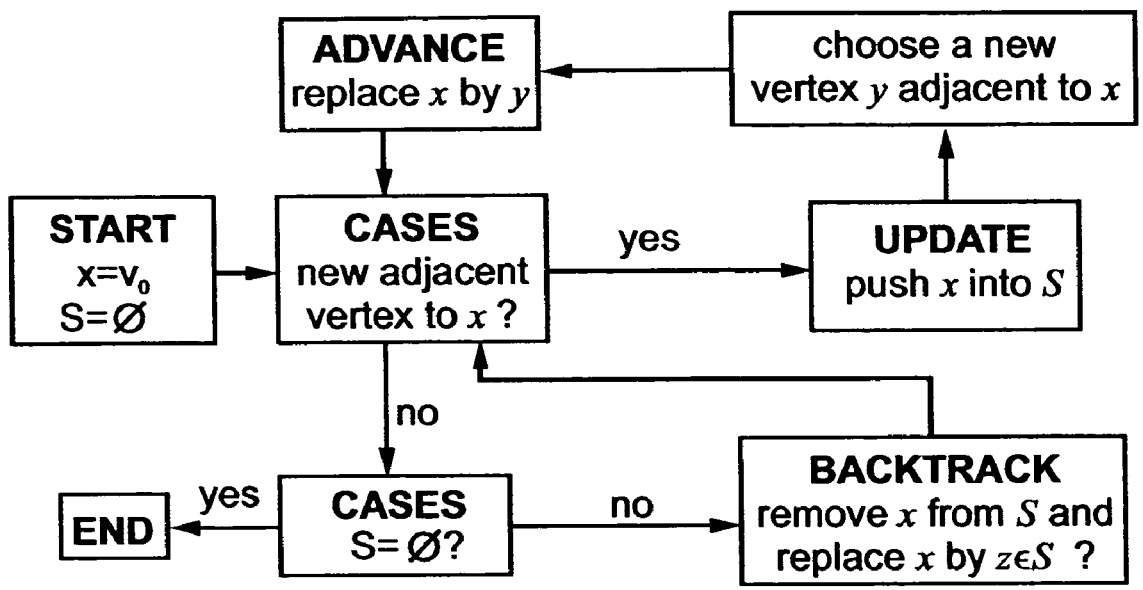
FIG. 1 is a flowchart of a DFS algorithm according to prior art.

For purposes of better understanding the present invention, as illustrated in FIGS. 2–14 of the drawings, reference is first made to a conventional (i.e., prior art) depth-first search (DFS) algorithm as illustrated in a flowchart of FIG. 1.

DFS is a well known algorithm, first disclosed in the 19$^{th}$ century by G. Tarry in an article entitled "Le problem des labyrinths" published in Nouvelles Annales de Mathematiques, 14:187, 1895. The algorithm is typically used for traversing a graph having vertices and edges, finding all vertices which are connected by a path of edges to a given vertex called an origin.

Hence, considering a graph G(V,E) having a set of vertices V and a set of edges E, according to the DFS algorithm illustrated in FIG. 1, one starts with a chosen origin $v_o \in V$ and an empty stack (S=Ø), advances on graph G to a new (i.e. yet unvisited) vertex adjacent to starting vertex $v_o$, and keeps advancing to new adjacent vertices while updating stack S, until no new vertex is adjacent to the current vertex. At this point stack S includes at least a portion of the spanning tree of the origin $v_0$.

Next one backtracks from the last visited vertex to an already visited vertex having at least one unvisited adjacent vertex. The procedure is repeated iteratively, while removing from stack S all vertices which have no more unvisited adjacent vertex. The procedure halts when the following two conditions are fulfilled: (a) the current vertex has no unvisited vertices, and (b) stack S is empty.

One of the features of the algorithm is the backtracking information which is stored while traversing graph G. However, this storage of information requires enough memory to contain stack S, which, in principle, may be as large as graph G. Hence, although stack S eventually becomes empty, a conventional DFS algorithm cannot be executed without reserving sufficient memory for the backtracking information. The present embodiments provide a machine which implements the above algorithm without the need to allocate additional memory for storing the backtracking information, i.e. the amount of memory which is required for traversing the entire graph is independent of the size of the graph. As will be discussed in greater detail below, the backtracking information may rather be stored in the vertices of the graph to be visited which may be realized, for example through a pixel frame buffer memory.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

According to a first embodiment of the present invention there is provided an apparatus for coloring a plurality of cells using a predetermined fill-color, the cells occupying a region in a grid of cells, thereby defining a plurality of region-cells.

Figure 2:
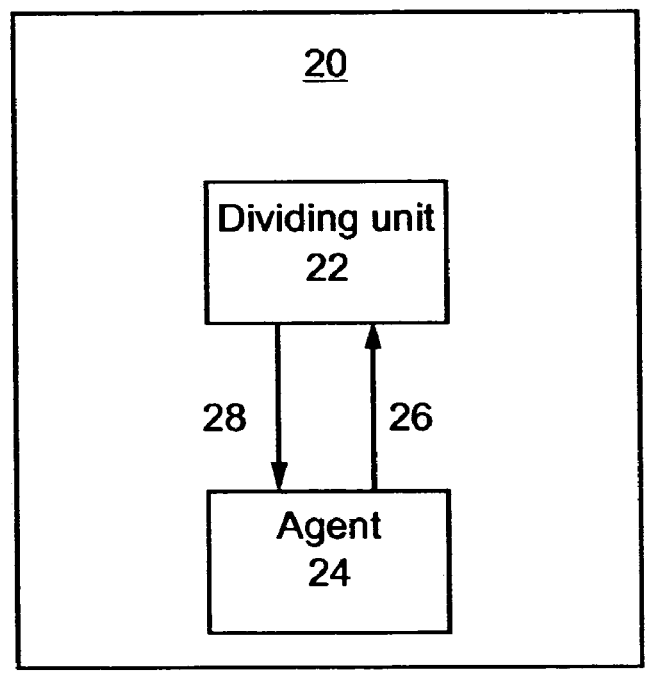
FIG. 2 is a an apparatus for coloring a plurality of cells using a predetermined fill-color, according to a first embodiment of the present invention.

Referring now again to the drawings, FIG. 2 illustrates the apparatus, hereinafter referred to as apparatus 20. As shown in FIG. 2, apparatus 20 includes a dividing unit 22, for dividing the grid into a plurality of elementary-regions. According to a preferred embodiment of the present invention, each elementary-region comprises at least one cell, and all the elementary-regions are preferably chosen to have equal sizes and topologies such as, but not limited to, a single cell, or an n by n square of cells, where n is an integer other than 1. Dividing unit 22 communicates with an agent 24 which is capable of moving from one elementary-region to another. Communication channels 26 and 28 between dividing unit 22 and agent 24 are marked by solid arrows in FIG. 2.

Figure 3:
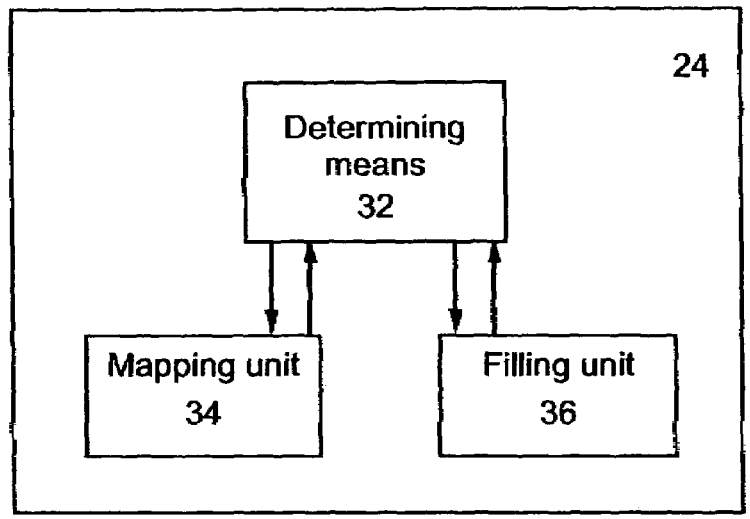
FIG. 3 is a block diagram illustrating the components of the agent, according to an embodiment of the present invention.

Reference is now made to FIG. 3, illustrating the components of agent 24. Agent 24 preferably includes means 32 for determining, for each cell of the elementary-region, whether the cell is a region-cell. Agent 24 further includes a mapping unit 34 for writing color data in each cell of the elementary-region using a color selected from a color-space which is available from the system storing the grid. For example if the grid is stored in a form of a pixmap, having two bits allocated for each pixel, the color-space includes 4 colors, for three bits per pixel the color-space includes 8 colors and so on.

It is to be understood, that mapping unit 34 is operable only on region-cells, thus mapping unit 34 communicates with means 32.

According to a preferred embodiment of the present invention, the color data written by mapping unit 34 is used by agent 24 as information directing a backtracking path in the region, in a manner similar to the backtracking step of the DFS algorithm as explained hereinabove, with reference to FIG. 1.

Agent 24 further includes a filling unit 36. Filling unit 36 serves for writing color data in each cell of the elementary-region using the (predetermined) fill-color. Such operation is required when agent 24 backtracks to an elementary-region which has been visited before, as further detailed hereinunder.

It is to be understood that although both mapping unit 34 and filling unit 36 color region-cells, they serve different purposes. Thus, agent 24 may operate in two modes, one mode in which mapping unit 34 stores information in the elementary-region, and another mode in which filling unit 36 colors the region-cells of the visited elementary-region in the fill-region, hence completing the assignment of agent 24 on the visited elementary-region.

The mode in which mapping unit 34 is operative will be referred to hereinafter as a forward mode, and the mode in which filling unit 36 is operative will be referred to hereinafter as a backtracking mode.

Figure 4:
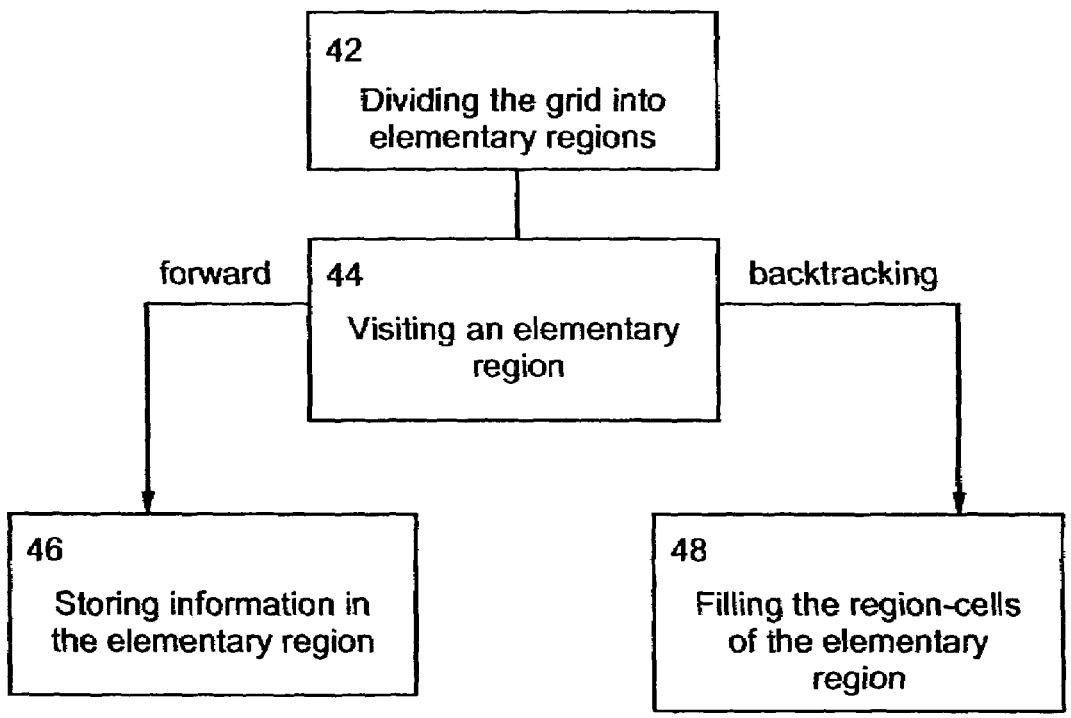
FIG. 4 is a block diagram illustrating a method of coloring a plurality of cells using a predetermined fill-color according to an embodiment of the present invention.

The principles and operations of apparatus 20 are described herein with reference to FIG. 4 which is a simplified flow chart depicting the method according to which apparatus 20 operates.

Hence, block 42 represents a first step in which the grid is divided into a plurality of elementary-regions, each comprising at least one cell, as explained hereinabove with respect to dividing unit 22. Block 44 represents a second step of the embodiment, which is to visit one elementary-region at a time and to determine, for each cell of the visited elementary-region, whether the cell is a region-cell.

According to a preferred embodiment of the present invention, block 46 represents a third step, in which a specific color is chosen for each region-cell, which specific color is written into the cell, so as to store information in the elementary-region, as further detailed hereinbelow. As stated, the information is used for directing a backtracking path in the region hence, for each elementary-region, so that by the time the third step is completed a mapped elementary-region is obtained.

Block 48 represents a fourth step, in which all the mapped elementary-regions are visited (again) along the backtracking path and the fill-color data is written in each region-cell of each mapped elementary-region along the backtracking path.

According to a preferred embodiment of the present invention all elementary-regions are visited at least twice: first in a forward mode and second in a backtracking mode, hence the method ensures that all the region-cells are colored by the fill-color. Hence, the present embodiment may be said to use DFS described hereinabove as a "building-brick".

There are two alternatives for defining the region to be filled. According to a preferred embodiment of the present invention the region may be defined either by a group of connected cells initially having a predetermined region-color, or by a group of connected cells initially having a color other than a predetermined boundary-color. In other words the region may be defined by its interior i.e. by the color of the cells occupying the region or by a closed path forming its boundary.

The difference between these two definitions of the region is expressed through the operation of mapping unit 34, which is defined by a set of rules for encoding the backtracking information. In what follows, for a better understanding of the present invention, these rules are explained in detail for a rectangular grid. It should be appreciated that other sets of rules may be employed, provided that the backtracking information may be retrieved by agent 24, while in backtracking mode.

The operation of mapping unit 34 is first described for the case in which the region is defined by its interior. According to the presently preferred embodiment of the invention, for a region defined by its interior each elementary-region is selected to be a single cell. Hence, each vertex v∈V on graph G corresponds to a single cell of the grid, and two vertices $v_i$ and $v_j$ are connected by an edge $e_{ij}$ if the corresponding cells $c_i$ and $c_j$ are neighbors on the grid, respectively.

On a rectangle grid, it is necessary to differentiate between 4-connected neighbors and 8-connected neighbors. Let c(x,y) be a cell on a rectangle grid located at horizontal coordinate x and vertical coordinate y. The phrase 4-connected neighbor refers to an element of a set of four neighbors whose centers are nearest neighbors to the center of c, specifically, these are c(x+1,y), c(x−1,y), c(x,y+1) and c(x,y−1). The phrase 8-connected neighbor refers to an element of a set of eight neighbors whose centers are nearest neighbors and next-to-nearest neighbors to the center of c, specifically, these are the four 4-connected neighbors together with c(x+1,y+1), c(x−1,y+1), c(x+1,y−1) and c(x−1,y−1).

According to a preferred embodiment of the present invention the minimal size of the color-space which is required for the operation of mapping unit 34 is four colors. This minimal number of colors corresponds to a 4-connected region, i.e. edge $e_{ij}$ connects vertices $v_i$ and $v_j$ if and only if the corresponding cells $c_i$ and $c_j$ on the grid are 4-connected neighbors.

For a better understanding of the invention, a simpler case, employing six colors, is described herein, while the four colors case is described hereinafter. In any case, it should be appreciated that no dedicated colors are necessary for the operation of mapping unit 34, and all the backtracking information is stored using "built-in" colors, i.e. colors which are already available at the interface employing the embodiment.

Of the six available colors, one color is the initial color of the region, one is used by agent 24 for coloring the starting cell and four colors are allocated by agent 24 for directional information as described hereinbelow.

As used herein, the initial color of the region is referred to as region-color, the color used for coloring the starting cell is referred to as the halting-color, and the four colors used for directional information are referred to as color 0, color 1, color 2 and color 3.

Since each cell has four neighbors, one of the colors 0–3 is used by agent 24 for storing the direction from which the cell was previously visited. For example, if agent 24 enters a cell from below, mapping unit 34 writes color 0 in the cell, if agent 24 enters a cell from the left side, mapping unit 34 writes color 1 in the cell, and so on. As these colors are different from the initial color of the region, agent 24 is thereby able to know whether a cell is an unvisited region-cell or not. The fill-color, is typically one of the colors labeled color 0 to color 3, since the geometry of the grid implies that no cell is entered more than four times. In addition, the cells on the boundary of the region may store colors used by agent 24 for storing backtracking information, because agent 24 which uses the stored information in a backtracking mode, always arrives at cells on the boundary in a forward mode.

At the start, the halting-color is written into the starting cell (the origin). Agent 24 then moves to one of the neighboring region-cells, stores there an appropriate color pointing to the origin and starts a DFS cycle, as described hereinabove with reference to FIG. 1. When the DFS cycle is completed, agent 24 backtracks to the origin and is able to identify it as the starting cell, since in all other cases in which agent 24 is in backtracking mode the visited cell has one of colors 0 to 3. It is possible that the origin has other region-cell neighbors which are not connected to the neighbor from which the DFS was invoked. In this case the DFS is initiated again from any of these neighbors.

Finally, when agent 24 backtracks to the origin and all of its neighbors are processed, filling unit 36 writes the fill-color into the starting cell, and agent 24 halts.

As stated, the minimal size of the color-space which is required for the operation of mapping unit 34 on a 4-connected region is four. This limitation should be addressed for example when the region is defined on a pixmap having two bits per pixel. In the above description, there are two "special" colors which are used by agent 24, the region-color and the halting-color. These colors can be chosen from the directional colors (color 0 to color 3), provided that agent 24 is able to memorize the directions of outgoing neighbors from a single cell of the region, as described herein.

It should be appreciated that although agent 24 includes a memory, it does not violate the prerequisite for a finite state machine, since the amount of memory does not depends on the size of the grid.

Thus, for example, color 0 may be chosen to be the region-color, and color 3 may be chosen to be the fill-color. If agent 24 enters a color 0 cell then this is an unvisited cell, otherwise agent 24 determines that the cell was visited before.

When a cell is visited for the first time, agent 24 moves from the cell in different directions in a predetermined order (say, clockwise order) starting from the direction next to that from which the cell was entered. On each exit from each cell, agent 24 increases by 1 the color stored in the cell. Thus, while in backtracking mode, agent 24 is able to identify the cell it enters. Specifically, if the cell stores color 3, then all directions from the cell have already been processed, otherwise some neighbors still need to be visited. Since color 3 was chosen to be the fill-color, agent 24 exits from a color 3 cell in a direction next to that from which it was just entered, without changing the color.

For example, if agent 24 entered cell c for the first time from above, firstly it exits to the right and writes color 1 into c, secondly it exits down from c writing color 2 into it, and thirdly it exits to the left of c and writes color 3 into it. When the agent backtracks to c from the left it backtracks in the next direction which is upwards, leaving the color of c unchanged since it is already the fill-color.

Under normal circumstances agent 24 never backtracks to a cell having color 0, since color 0 was chosen to be the region-color. Thus, for providing the halting condition, the halting-color is chosen to be color 0.

However, as discussed above, agent 24 may enter the origin more than once (from different neighbors) therefore it might misidentify the origin as a new (yet unvisited) cell. To avoid this, before exiting from the origin, agent 24 memorizes in its state the relative locations of the rest of the neighbors and "seals" them by changing their colors to one of the boundary colors. Since all the rest of the neighbors are "sealed", the only way agent 24 may return to the origin is by backtracking from the neighbor used for exiting the origin. Once backtracked to the origin agent 24 restores, using its memory, one of the neighboring region cells leaving the others "sealed". When all of the neighbors of the origin are processed, filling unit 36 writes the fill-color into the starting cell, and agent 24 halts.

Reference is now made to FIGS. 5(1–15), illustrating a motion of agent 24 on a 4-connected region having 4×5 cells, according to the presently preferred embodiment of the invention. The location of agent 24 in each figure is marked by a cell with bold edges, and the color stored in each cell is represented as a number inside the cell. FIG. 5(1) represents the starting point of agent 24, i.e. the origin. In FIG. 5(2) agent 24 is preparing to exit from the origin from above in order to begin a first DFS cycle. Hence it "seals" the region-cells from the left and from the right by writing color 1 into these cells. The DFS cycle is illustrated in FIGS. 5(3) to 5(7).

In FIG. 5(8) agent 24 returns to the origin after completing a DFS cycle. In FIG. 5(9), agent 24, "unseals" the cell from the right by writing color 0 into it, and starts the next DFS cycle, which is illustrated in FIGS. 5(10) and 5(11). In FIG. 5(12), agent 24, "unseals" the cell from the left by writing color 0 into it, and starts another DFS cycle, which is illustrated in FIGS. 5(13) and 5(14). Finally in FIG. 5(15) agent 24, after processing all neighbors of the origin, writes the fill-color into the origin and stops.

The present embodiments may be successfully implemented also on an 8-connected region, i.e. edge $e_{ij}$ connects vertices $v_i$ and $v_j$ if and only if the corresponding cells $c_i$ and $c_j$ on the grid are 8-connected neighbors. The minimal number of colors required for an 8-connected region is 8, which may be selected, for example, when the embodiments are employed on a pixmap having three or more bits per pixel. Corresponding to the notation used above the eight colors are denoted herein by integers from 0 to 7.

Of the eight available colors, one is used for marking the origin and the remaining seven are used for mapping the seven possible exits from a given cell.

Thus, color 0 is chosen to be the region-color, and color 7 is chosen to be the fill-color. As in the 4-connected region described above, if agent 24 enters a color 0 cell then this is an unvisited cell, otherwise agent 24 determines that the cell was visited before.

When a cell is visited for the first time, agent 24 moves from the cell in different directions in a predetermined order (say, clockwise order) starting from the direction next to that from which the cell was entered. On each exit from each cell, agent 24 increases by 1 the color stored in the cell. When agent 24 backtracks to a color 7 cell, it knows that all directions from the pixel have already been processed and backtracks. Upon exit from the origin, agent 24 "seals" the rest of the neighbors, in order to avoid entering the origin from a side other than that from which it was last exited, as described hereinabove.

The operation of mapping unit 34 on a 4-connected region defined by its boundary is described herein.

It is to be understood that the approach described above is not applicable for and will not work for a region defined by its boundary since a region-cell can have any color, except the boundary color. Thus agent 24 is unable to identify, based on the color of a certain region-cell, whether or not this cell is a new unvisited region-cell. Moreover, some cells in the region may initially have the fill-color and agent 24 may mistakenly identify such cells as if they were already backtracked leaving, potentially, part of the region not filled.

According to the presently preferred embodiment of the invention, for a region defined by its boundary, each elementary-region is selected to be a 2×2 square of cells. Two elementary-regions are said to be 4-connected if there exist two cells, one in each elementary-region, that are 4-connected. As stated, the color stored in each cell may either be the boundary-color or another color. According to a preferred embodiment of the present invention, the elementary-regions containing at least one region-cell are identified as one of three types of elementary-regions, as further detailed herein.

Reference is now made to FIG. 6, which depicts two of the three types of elementary-regions, where white squares correspond to the boundary cells and gray squares to region-cells of any color. FIG. 6(1) illustrates a first type, characterized by cells having two boundary-cells and two region-cells. The boundary-cells are positioned at the upper-left and the lower-right corners of the elementary-region. Similarly, FIG. 6(2) illustrates a second type, characterized by cells having two boundary-cells and two region-cells, with the boundary-cell being positioned at the upper-right and the lower-left corners of the elementary-region. All other elementary-regions are identified as a third type.

According to a preferred embodiment of the present invention each elementary-region of the third type is represented by a vertex $v \in V$ on graph G. In addition, each elementary-region of the first type is represented as two vertices $\{v^{ur}, v^{dl}\} \in V$ on graph G. Still in addition, each elementary-region of the second type is represented as two vertices $\{v^{ul}, v^{dl}\} \in V$ on graph G. Implying the above rules for constructing graph G, ensures that each region-cell in the grid corresponds to one and only one vertex of graph G.

Two vertices corresponding to a pair of 4-connected elementary-regions are connected by an edge e of graph G. The exceptions are the vertices corresponding to the elementary-regions shown in FIG. 6. Vertices with the superscript "ur" can be connected only to the vertices that are above or to the right of the corresponding cell, vertices with the superscript "dl" can be connected only to the vertices that are below or to the left and so on.

A skilled artisan would appreciate that graph $G=G(V,E)$ constructed as detailed above is a connected graph.

According to a preferred embodiment of the present invention, once graph G has been constructed, DFS cycles are employed on it. It should be understood that although agent 24 is a finite state machine, it is capable of visiting and storing all four cells of a corresponding elementary-region one by one. Furthermore, agent 24 is capable of storing its relative location while visiting a cell within the elementary-region.

As further detailed hereinbelow, different color configurations of the elementary-regions together with a predetermined exiting order from each elementary-region provide a unique prescription for the motion of agent 24.

Reference is now made to FIGS. 7(1–12), which depict all possible configurations of an elementary-region at the moment when agent 24 enters it for the first time from below. One ordinarily skilled in the art may construct possible configurations of an elementary-region, if agent 24 enters it from other directions, by rotation of each individual figure of FIG. 7. In FIG. 7, white squares correspond to the boundary cells and gray squares to region-cells of any color other than the boundary-color. As can be understood, if an elementary-region contains at least one region-cell, it cannot contain any external cell (i.e. cell located outside the boundary of the region to be filled). When coming from below, agent 24 preferably first processes the neighbor from the right, then the neighbor from the left and, finally, the neighbor from above.

Any elementary-region in FIG. 7 is chosen to be represented by a color other than the boundary-color. This color, referred to herein as "the information color" is intended to store the kind of the elementary-region, namely, the locations of the boundary-cells inside.

According to a preferred embodiment of the present invention when agent 24 enters for the first time, say from below, an elementary-region P, an information color i is assigned to store the backtracking information. Once agent 24 enters the elementary-region P, it looks for neighboring elementary-region having region-cells which already store the fill-color. In order to avoid confusion on the next visit of P, agent 24 replaces the colors of these cells with some region color, which may be any color other than the boundary-color or the fill-color. This rule ensures that at any given time, when agent 24 tries to enter some elementary-region and finds out that some of the cells in it have the fill-color, it identifies the elementary-region as "closed", i.e. all its neighbors have been already visited, and all the region-cells in the elementary-region store the fill-color. Hence, for any newly visited elementary-region, agent 24 removes all "closed" flags of its neighbors.

On some applications, however, the fill-color may be equal to the boundary-color. In this special case the problem that agent 24 will reopen "closed" elementary-regions is irrelevant, since closed elementary-region will be of the boundary-color. Thus, when agent 24 enters an elementary-region for the first time, it changes the color of the neighboring region-cells from the fill-color to some other color if and only if the fill-color is different from the boundary-color.

Before exiting to the right, agent 24 "seals" the cell from above and from the left, changing the colors of all cells of the elementary-region to the fill-color, except the lower-right corner, into which information color i is written. Thus, some edges of graph G are temporarily cut so that by the next time agent 24 enters elementary-region v, it will be while backtracking from the right. Similarly, when agent 24 exits from an elementary-region to the left, it "seals" the elementary-region from above and from below, writing color i into the lower left corner. Finally, when agent 24 exits from above, it restores the boundary-cells and writes color i into each of the other cells of the elementary-region. Thus, the cells on which color i data is written are chosen so as to mark an "entry-exit" direction, which is used on the following visit(s) of agent 24 in P.

Agent 24 exits the elementary-region in a forward mode only if it is able to do so i.e. if there is no corresponding edge in graph G in some direction, the direction is skipped. In addition, agent 24 does not exit from an elementary-region to the left or upwards, if there is a neighboring cell having the fill-color in that corresponding direction. This means that the corresponding elementary-region is "closed", since agent 24 re-colors all neighboring cells of the fill-color before it exits to the right.

Reference is now made to FIGS. 8(1–3) which illustrate the backtracking rules. In each figure, the left-hand side illustrates the color configuration of an elementary-region as seen by the agent, and the right-hand side illustrates the exit direction and the color configuration of the elementary-region just before exiting. A broken line corresponds to a backtracking mode of the agent and a continuous line to the forward mode.

Hence, once all three possible exits from an elementary-region are explored, agent 24 switches to a backtracking mode. When agent 24 enters an elementary-region $P_1$, which is not the origin, from an elementary-region $P_2$ in a backtrack mode, at least one cell of $P_1$ adjacent to $P_2$ is of the region-color. Before exiting from an elementary-region upwards in a forward mode, agent 24 colors all four pixels of the elementary-region in corresponding information color i.

Referring to FIG. 8(3), if all the cells of $P_1$ are of some region color, the agent determines that all edges adjacent to a current vertex of the graph G have already been processed. Using a table of colors corresponding to the different color configurations of the elementary-regions in FIG. 7, agent 24 restores the boundary pixels of $P_1$, fills the region-cells in the fill-color and backtracks in the same direction it was moving while entering $P_1$ from $P_2$. Similarly, if agent 24 has just entered the elementary-region from the right, it exits to the left, and so on.

Referring to FIG. 8(1), if only the left corner of $P_1$ which is the nearest to $P_2$ is of some region color, it colors the farthest left corner with color i and all the rest cells of $P_1$ with the boundary-color, and exits in the same direction it used in order to enter $P_1$.

Finally, referring to FIG. 8(2), if only the nearest right corner is of a region color, agent 24 fills all pixels of $P_1$ with color i and exits $P_1$ from above.

A priory, it looks as if the method described requires relatively large number of colors to store backtracking information while filling a region defined by its boundary. This is because of the large number of color configurations of FIG. 7, which are represented by the information color i. However, examining FIG. 7, one can find some pairs of color configurations which are invariant under a 180° rotation (horizontal flip). For example the color configurations of FIG. 7(2) and FIG. 7(3). From the properties of DFS, once an elementary-region is "closed", it cannot be revisited.

Thus, there is no need to "seal" the elementary-region of FIG. 7(2) from the right if agent 24 backtracked to it from the right and exits to the left. Similarly, the elementary-region of FIG. 7(3) need not be "sealed" from the left if agent 24 backtracked to it from the left and exits to the right. After a second backtrack to an elementary-region, using the information color i and the location of the absent "seal", agent 24 is able to restore its form before exiting upwards.

In addition, no colors need to be allocated for the elementary-region of FIGS. 7(6–7) and FIG. 7(7), since each of these elementary-regions corresponds to two vertices of graph G, and need not be "sealed" at all. In backtracking mode, agent 24 may recognize the elementary-region by its diagonal boundary structure.

Hence, according to a preferred embodiment of the present invention, the minimal number of colors necessary for implementation of the above method is 8, which number is available on a conventional display having a pixmap of three bits per pixel.

The colors are allocated as follows: (i) a boundary-color; (ii) a fill-color; (iii) a color for representing an elementary-region having four region-cells as exemplified in FIG. 7(1); (iv) a color for representing an elementary-region having three region-cells, and one boundary-cell located at the nearest corner with respect to the entry direction, as exemplified in FIGS. 7(2–3); (v) a color for representing an elementary-region having a pair of 4-connected region-cells and a pair of 4-connected boundary-cells, where the two pairs are oriented parallel to tie entry direction, as exemplified in FIGS. 7(4–5); (vi) a color for representing an elementary-region having three boundary-cells, and one region-cell located at the nearest corner with respect to the entry direction, as exemplified in FIGS. 7(8–9); (vii) a color for representing an elementary-region having three region-cells, and one boundary-cell located at the farthest corner with respect to the entry direction, as exemplified in FIGS. 7(10–11); and (viii) a color for representing an elementary-region having a pair of 4-connected region-cells and a pair of 4-connected boundary-cells, where the two pairs are oriented orthogonal to the entry direction, as exemplified in FIG. 7(12).

The filling process comprises initiation as follows: According to a preferred embodiment of the present invention the initial elementary-region, from which the DFS first starts, should contain the origin cell (which is, by definition, a region-cell) and at least one region-cell, which is 4-connected to the origin. The boundary-color is written into the cells of the initial elementary-region. Agent 24 identifies the origin when it backtracks to an elementary-region with four cells having the boundary-color. When all four origin neighbors are processed, agent 24 recalls the relative locations of the region-cells in the initial elementary-region, writes the fill-color into these cells and halts.

A skilled artisan would appreciate that since graph G is connected, any region-cell belongs to some elementary-region. Moreover, since agent 24 eventually explores all neighboring elementary-regions of any of the elementary-regions containing region-cells, when agent 24 backtracks to the origin, all region-cells are colored in the fill-color.

Figure 9:
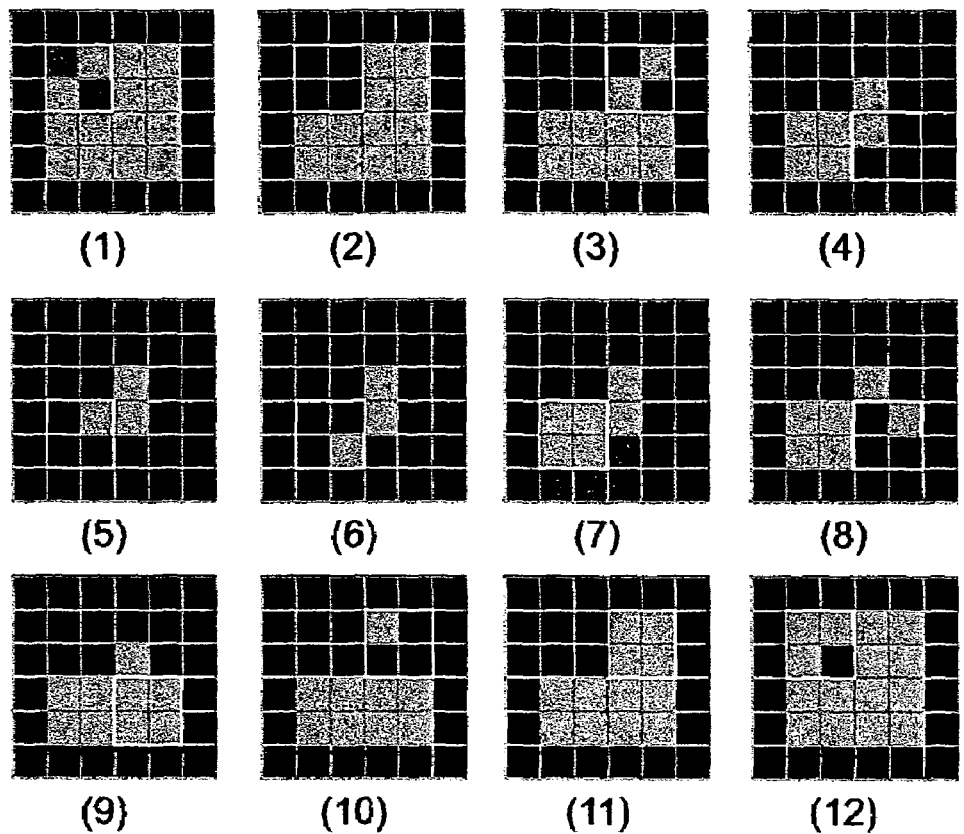
FIG. 9 is a caption of 12 screenshots of a run on a 4×4 region defined by a boundary of 4×4.

Reference is now made to FIGS. 9(1–12), which are 12 screenshots of the presently preferred embodiment of the invention, running on a simple region of 4×4 cells, defined by a boundary of 6×6 cells. In the figures a bold 2×2 square represent the location of agent 24. At the end of the process, the region is filled, and agent 24 is instructed to halt.

While reducing the present invention to practice, it has been found that a variant of the above method may be used for controlling a motion of a robot, being capable of moving from cell to cell inside a predetermined region, without stepping outside the region, and being capable of cleaning a cell on which it stands.

Hence, according to another aspect of the present invention there is provided a robot control apparatus for controlling a robot, referred to herein as apparatus 90.

Figure 10:
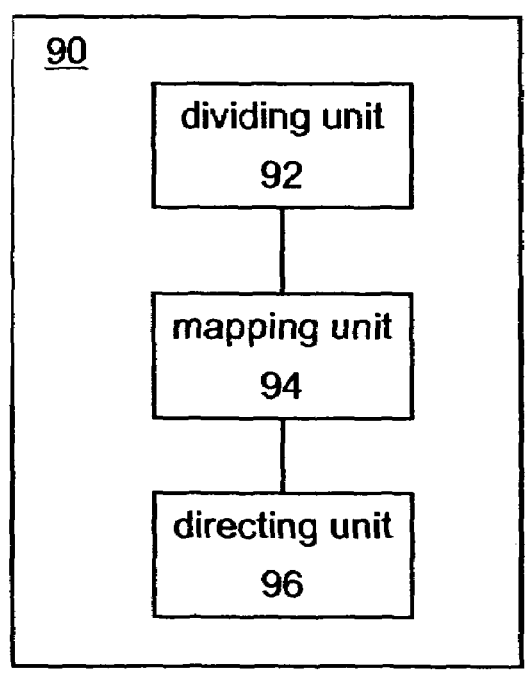
FIG. 10 is a robot control apparatus according to a preferred embodiment of the present invention.

Reference is now made to FIG. 10, which is a simplified block diagram of robot control apparatus 90. As shown in FIG. 10, apparatus 90 includes a dividing unit 92 for dividing the region into a plurality of elementary-regions, each comprising a plurality of cells. The principles and operations of dividing unit 92 are similar to those of dividing unit 22 of apparatus 20.

Apparatus 90 further includes a mapping unit 94, operable to communicate with the robot. Mapping unit 94 serves for instructing the robot to store information in the elementary-region, the information is used for directing a backtracking path of the robot. Unlike mapping unit 34 of agent 24, mapping unit 94 preferably instructs the robot to store the information in the elementary-regions in the form of clean cells and dirty cells.

In addition, apparatus 90 includes a directing unit 96 operable to communicate with the robot. In use, directing unit 96 serves for sending motion instructions to the robot. Unlike the motion commands, the cleaning commands (being sent by mapping unit 94) are binary. That is to say there are only two cleaning commands, one for cleaning a cell on which the robot is located and the other to leave it dirty.

The operation of apparatus 90 is based on the method described above. Hence, according to a preferred embodiment of the present invention the elementary-regions are chosen so that the information stored in each elementary-region (in the form of dirty cells and clean cells) would be used in the backtracking mode for directing the robot back, all the way to its starting point (the origin).

The robot, which is defined to be a cleaning robot, does not use a multicolor space, therefore it cannot mark its direction by defining a directional color for each cell in the region, as done in the case where the region is defined by its interior. Hence, the robot traverses a region which is closely related to a region which is defined by its boundary, where an elementary-region comprises more than one cell, for example, a 2×2 square of cells as successfully demonstrated above for a 4-connected region.

The present embodiment also addresses a different problem. Robots which are dedicated for cleaning the region in which they move are often constrained to clean a cell in a "one shot" operation, which means that these robots can clean a cell in the region but they cannot make it dirty again.

The presently preferred embodiment of the invention is described herein, by exemplifying a motion of a robot inside a 4-connected region. It is appreciated that the present invention may be employed also on other topologies, provided that backtracking information may be restored from each elementary region, using constant memory-space independently of the size of the region.

According to a preferred embodiment of the present invention dividing unit 92 operates to divide the region into a plurality of elementary-regions, each being selected to be a 2×2 square of cells. The cells in each elementary-region may be either region-cells which are to be cleaned or holes into which the robot does not enter. Graph G, upon which the DFS cycles are employed, is constructed using the three types of vertices discussed above, $\{v, v^{ur}, v^{dl}\} \in V$, which may or may not be connected by an edge e, according to the above-described rules.

The rules of operation of directing unit 96 and of mapping unit 94 are herein described.

When the robot arrives to an elementary-region $P_1$ from an elementary-region $P_2$, it checks the cells of $P_1$, and sends the information to directing unit 96 and to mapping unit 94. If no cells are clean, mapping unit 94 instructs the robot to clean only the cells which are adjacent to $P_2$. Since there is an edge connecting the vertices of G which correspond to $P_1$ and $P_2$, at least one cell is cleaned when $P_1$ is visited for the first time. In other words, mapping unit 94 may decide to keep some of the cells dirty, leaving them to be cleaned at some later stage. Hence, mapping unit 94 stores information in the elementary-region. This information, supplemented by a set of well-defined backtracking rules, will be used later for the backtracking.

If, on the other hand, some of the cells in $P_1$ may be already clean when the robot arrives to $P_1$, which means that $P_1$ has already been visited before. In this case directing unit 96 instructs the robot to backtrack to $P_2$, thereby to check other possible continuations.

For a given direction from which the robot has just entered an elementary-region, the instructions provided by mapping unit 94 are sufficient to provide directing unit 96 a unique prescription for directing the motion of the robot as further detailed herein.

Figure 11:
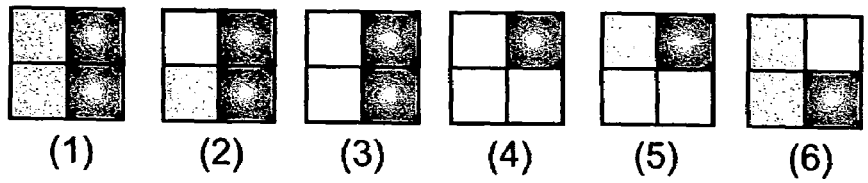
FIG. 11 is a list of configurations in which the cleaning robot, arriving to an elementary-region from above, backtracks to the right.
Figure 12:
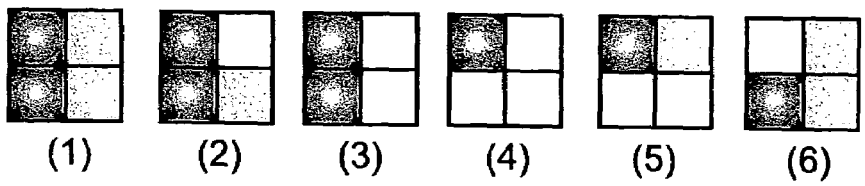
FIG. 12 is a list of configurations in which the cleaning robot, arriving to an elementary-region from above, backtracks to the left.
Figure 13:
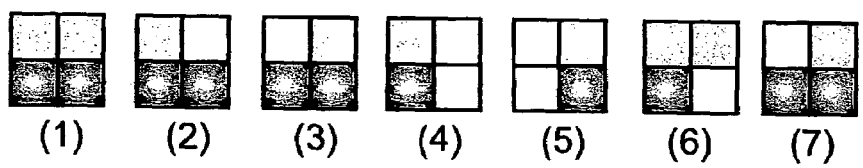
FIG. 13 is a list of configurations in which the cleaning robot, arriving to an elementary-region from above, backtracks downwards.

Reference is now made to FIGS. 11–13, which illustrate the backtracking rules for the cleaning robot, arriving at an elementary-region from above. Analogs to FIGS. 11–13 when the robot arrives from other directions can be trivially obtained by rotation. In the figures, gray squares correspond to (currently) dirty cells, the darker "fountain" filling corresponds to the cleaned cells and white cells correspond to holes in the region to be cleaned or to its outer space.

According to a preferred embodiment of the present invention the robot backtracks to the right, left or upwards upon arriving at elementary-regions shown respectively in FIGS. 11, 12 and 13.

It may be understood that the configurations of the elementary-regions of FIGS. 11(4), and 12(4) do not define exclusively from which direction the robot has arrived. For example, seeing the configuration of FIG. 11(4), one may conclude either that the robot entered from above or from the right. The missing information is supplied by directing unit 96 which, upon each entrance of the robot to an elementary-region, stores the direction from which it entered. Hence, when the robot "knows" that it backtracked to the elementary-region from above, it "knows" that it is now required to backtrack to the right.

Although the configuration shown in FIG. 11(4) can correspond to an elementary-region in which the lower-left corner is either a region-cell or a hole, the robot cannot "see" this when it arrives from above. This causes no confusion, since in both cases the robot backtracks to the right. Similarly, FIG. 12(4) can correspond to an elementary-region of which the lower right corner is either a region-cell or a hole.

After visiting an elementary-region for the first time, the robot processes the neighbors in some predetermined order. The robot backtracks once all possible directions for continuation are processed, i.e. when all the neighbors of the elementary-region have some clean cells. Upon backtracking, mapping unit 94 instructs the robot to clean all the cells of the elementary-region.

Two exceptions include elementary-regions as shown in FIGS. 11(4) and 12(4), where there are only two possible directions for continuation from such an elementary-region. Since the corresponding vertices ($v^{ur}$ or $v^{ul}$) are of degree 2, the robot arriving at the elementary-region in a backtracking mode has only one choice for continuation: to backtrack from the elementary-region.

The robot is preferably able to become aware of the completion of its job. At such a point of completion it preferably halts, the idea being that, at this point, all region cells are clean. According to the DFS algorithm, at the end of all the processing cycles, the robot arrives at its initial location (the origin). A direct conclusion from the above discussion is that the robot may also be able to identify its initial location. Hence, it is preferable to choose the initial elementary-region, on which the DFS first cycle starts and the last cycle is finished, so as to differentiate it from all other elementary-regions, when the robot is in a backtracking mode. The initialization of the robot motion and the halting condition, according to a preferred embodiment of the present invention, may be better understood by defining an irregular elementary-region.

Hence, an elementary-region is called irregular if it was not backtracked ("closed") and it has a pattern of cleaned cells that cannot be produced upon a first visit to the elementary-region. As stated, at most two cells (those nearest to the elementary-region from which the robot entered) can be cleaned at the first visit. Thus, typical examples of irregular elementary-regions are elementary-regions having more than 2 clean cells. Another example is elementary-regions with a cleaning pattern indicating that the robot is now required to backtrack to the right while both cells adjacent to the elementary-region from the right are holes.

According to a preferred embodiment of the present invention when the robot arrives in backtracking mode at an irregular elementary-region, both directing unit 96 and mapping unit 94 cease to send commands to the robot, and the robot halts.

The initial elementary-region is chosen such that it would be an irregular elementary-region. For example, let a cell with coordinates (0, 0) be the origin of the robot. If there are no cells that are 4-connected to the origin, the robot can halt after cleaning the cell; alternatively, there is at least one neighbor of the origin which is a region-cell. Assuming, for example, that the cell located at (0, 1) is a region-cell, then, according to a preferred embodiment of the present invention, if one of four cells located at (−1,0), (−1,1), (1,0) and (1,1) is a region-cell, an initial elementary-region is chosen to contain this cell together with the cells (0,0) and (0,1) and it is immediately cleaned. On the other hand, if all of the four cells are holes, the initial elementary-region is chosen to be any of the two elementary-regions containing the cells located at (0,0) and (0,1), and it is immediately cleaned.

It would be appreciated that any of the obtained elementary-regions described is irregular, ie. either containing more than two cleaned cells, or pointing to an impossible direction of backtracking.

Figure 14:
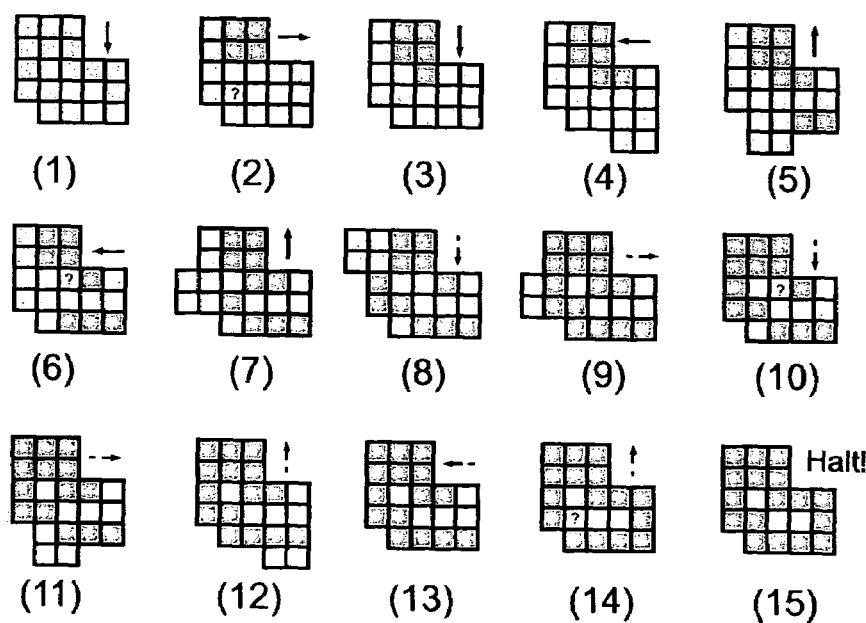
FIG. 14 is a motion and operation of the robot.

Reference is now made to FIG. 14, exemplifying the robot operations. As before, gray squares correspond to dirty cells, darker "fountain-filling" squares correspond to the cleaned cells, and white cells correspond to holes. Additionally, 2×2 squares with bold edges represent the location of the robot, and an arrow in the right upper corner marks the direction of the next move. The robot cleans the cells that it is instructed to clean just before leaving its current elementary-region and the result of the cleaning can be seen by comparing the figure corresponding to the current location of the robot to the next figure.

For the purpose of an illustrative description of the robot operations, some of the steps shown in FIG. 14 are herein provided. As can be seen in FIG. 14(2), after the first step the robot cleans all the 4 cells of the elementary-region on which it is standing. The lower left corner of the robot new location ("point of entry") is separated from the upper right corner by a diagonal of holes in the region. This cell has a question mark inside and is currently assumed to be a hole. Since the robot arrived at this elementary-region from above, before leaving, it cleans all upper cells of the elementary-region, in the present case this is the upper right corner.

In FIG. 14(3) the robot at the following step is going down. Before leaving, it cleans the upper left corner, as can be seen in by comparing FIG. 14(3) with FIG. 14(4). To the location of the robot in FIG. 14(4) it has arrived from above, hence in the corresponding elementary-region, the two upper cells are cleaned, as seen in FIG. 14(5).

Before leaving the location in FIG. 14(5) the robot cleans the upper left cell and moves upwards, to the location shown in FIG. 14(6). Again, when the robot moves to this location, the upper left cell of its new location is separated by a diagonal of holes from the "point of entry" hence this cell has a question mark inside and is currently assumed to be a hole. Finally, the robot halts in the origin elementary-region.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of coloring a plurality of cells using a predetermined fill-color, the cells occupying a region in a grid of cells thereby defining a plurality of region-cells, the method comprising:
   (a) dividing the grid into a plurality of elementary-regions, each comprising at least one cell;
   (b) visiting one elementary-region at a time and determining, for each cell of said elementary-region, whether the cell is a region-cell;
   (c) writing color data in at least one region-cell of each elementary-region using a color selected from a color-space so as to store information in said elementary-region, said information directing a backtracking path in the region, thereby providing a mapped elementary-region; and
   (d) using said information for visiting all said mapped elementary-regions along said backtracking path and for writing color data using the fill-color in each region-cell of each said mapped elementary-region along said backtracking path;
   thereby coloring all the region-cells with the fill-color.

2. The method of claim 1, wherein the grid is a regular grid.

3. The method of claim 1, wherein the grid is a two dimensional grid.

4. The method of claim 1, wherein the grid is selected from the group consisting of a triangular grid, a rectangle grid and a hexagonal grid.

5. The method of claim 1, wherein said color-space comprises at least four colors.

6. The method of claim 1, wherein all region-cells are initially colored by a region-color.

7. The method of claim 6, wherein each said elementary-region comprises a single cell.

8. The method of claim 1, wherein all region-cells are initially colored by a color other than a boundary-color.

9. The method of claim 1, wherein the region is a closed region.

10. The method of claim 1, wherein the region is a connected region.

11. The method of claim 10, wherein said connected region is selected from the group consisting of a 4-connected region and an 8-connected region.

12. The method of claim 1, wherein the region is selected from the group consisting of a simply-connected region and a non-simply connected region.

13. The method of claim 1, wherein all said elementary-regions comprise an equivalent topology.

14. The method of claim 1, wherein all said elementary-regions are of substantially equal sizes.

15. The method of claim 1, wherein each said elementary-region forms an n by n square where n is an integer other than 1.

16. The method of claim 1, further comprising temporarily storing directional information upon said visiting.

17. The method of claim 1, further comprising constructing a graph having a plurality of vertices and a plurality of edges, each said vertex corresponding to a single elementary-region, and each said edge connecting two said vertices, thereby providing, for each said edge, a pair of connected vertices.

18. The method of claim 17, wherein said pair of connected vertices respectively correspond to two 4-connected elementary-regions.

19. The method of claim 17, wherein said pair of connected vertices respectively correspond to two 8-connected elementary-regions.

20. The method of claim 7, wherein said color selected from said color-space comprises a color having an integer valued color-index, said integer value ranging from 0 to a maximal value.

21. The method of claim 20, wherein said maximal value is smaller by one than a size of said color-space.

22. The method of claim 20, further comprising setting a color having a zero color-index equal to said region-color.

23. The method of claim 20, further comprising setting a color having a maximal value color-index equal to the fill-color.

24. The method of claim 20, wherein said step (c) comprises selecting a halting-color and writing said halting-color into a single cell, said single cell being a starting cell.

25. The method of claim 24, wherein said selecting a halting-color comprising setting said halting-color equal to said region-color.

26. The method of claim 24, wherein said step (c) comprises writing a color other than said region-color into at least one cell neighboring said starting cell, thereby providing at least one sealed cell.

27. The method of claim 26, further comprising storing a relative direction of each said sealed cell with respect to said starting cell.

28. The method of claim 20, wherein said step (b) comprises, for each elementary-region, visiting all elementary-regions neighboring said elementary-region in a predetermined order.

29. The method of claim 28, wherein said step (c) comprises determining an existing color-index of each said elementary-region and increasing by 1 said existing color-index prior to exiting from said elementary-region.

30. The method of claim 7, wherein the region is a 4-connected region.

31. The method of claim 30, wherein said color selected from said color-space comprises: a color 0, a color 1, a color 2, a color 3, a halting-color and said region-color.

32. The method of claim 31, wherein said color 0 is equal to said region-color.

33. The method of claim 31, wherein said color 3 is equal to the fill-color.

34. The method of claim 31, wherein said step (c) comprises:
writing said color 0 prior to exiting said elementary-region from a first direction;
writing said color 1 prior to exiting elementary-region from a second direction;
writing said color 2 prior to exiting elementary-region from a third direction; and
writing said color 3 prior to exiting elementary-region from a fourth direction.

35. The method of claim 31, wherein said step (c) comprises writing said halting-color into a single cell, said single cell being a starting cell.

36. The method of claim 8, wherein each said elementary-region forms a 2 by 2 square of cells.

37. The method of claim 36, wherein said color selected from said color-space comprises a color having an integer valued color-index, said integer value ranging from 0 to a maximal value.

38. The method of claim 37, wherein said maximal value is smaller by one than a size of said color-space.

39. The method of claim 37, wherein said step (c) comprises selecting an information color and writing said information color data into at least one cell in said elementary-region, prior to exiting from said elementary-region, said at least one cell being chosen so as to mark an entry-exit direction.

40. The method of claim 39, wherein said information color is represented by a color-index ranging from 0 to 5.

41. The method of claim 40, wherein a color index 6 corresponds to said boundary-color and further wherein a color index 7 corresponds to the fill-color.

42. The method of claim 39, further comprising characterizing each elementary-region by an entry axis and a flip symmetry with respect to said entry axis.

43. The method of claim 42, further comprising, for each elementary-region, selecting an information color in accordance with both of said entry axis and said flip symmetry.

44. The method of claim 37, wherein said step (c) comprises selecting a halting-color and writing said halting-color into all cells occupying a predetermined elementary-region, said predetermined elementary-region being a starting elementary-region.

45. The method of claim 44, wherein said halting-color is equal to said boundary-color.

46. The method of claim 44, wherein said starting elementary-region comprises at least two region-cells.

47. An apparatus for coloring a plurality of cells using a predetermined fill-color, the cells occupying a region in a grid of cells, thereby defining a plurality of region-cells, the apparatus comprising:
(a) a dividing unit, for dividing the grid into a plurality of elementary-regions, each comprising at least one cell; and
(b) an agent capable of moving from one elementary-region to another, said agent comprising:
(i) means for determining, for each said cell of said elementary-region, whether said cell is a region-cell;
(ii) a mapping unit for writing color data in each said cell of said elementary-region using a color selected from a color-space so as to store information in said elementary-region, said information directing a backtracking path in the region; and
(iii) a filling unit for writing color data in each said cell of said elementary-region using the fill-color, while backtracking of said agent along said backtracking path.

48. The apparatus of claim 47, wherein the grid is a regular grid.

49. The apparatus of claim 47, wherein the grid is a two dimensional grid.

50. The apparatus of claim 47, wherein the grid is selected from the group consisting of a triangular grid, a rectangle grid and a hexagonal grid.

51. The apparatus of claim 47, wherein said color-space comprises at least four colors.

52. The apparatus of claim 47, wherein all region-cells are initially colored by a region-color.

53. The apparatus of claim 47, wherein all region-cells are initially colored by a color other than a boundary-color.

54. The apparatus of claim 47, wherein the region is a closed region.

55. The apparatus of claim 47, wherein the region is a connected region.

56. The apparatus of claim 55, wherein said connected region is selected from the group consisting of a 4-connected region and an 8-connected region.

57. The apparatus of claim 47, wherein the region is selected from the group consisting of a simply-connected region and a non-simply connected region.

58. The apparatus of claim 47, wherein said dividing unit comprises a joining unit for forming a plurality of n by n squares of cells, where n is an integer other than 1, thereby to provide said plurality of elementary-regions, each comprising a single said n by n square of cells.

59. The apparatus of claim 47, wherein said agent further comprises a memory having a predetermined size, independent of a size of the grid.

60. The apparatus of claim 47, further comprising a graph constructor, for constructing a graph having a plurality of vertices and a plurality of edges, each said vertex corresponding to a single elementary-region, and each said edge connecting two said vertices, thereby providing, for each said edge, a pair of connected vertices.

61. The apparatus of claim 60, wherein said pair of connected vertices respectively correspond to two 4-connected elementary-regions.

62. The apparatus of claim 60, wherein said pair of connected vertices respectively correspond to two 8-connected elementary-regions.

63. The apparatus of claim 52, wherein said color selected from said color-space comprises a color having an integer valued color-index, said integer value ranging from 0 to a maximal value.

64. The apparatus of claim 63, wherein said maximal value is smaller by one than a size of said color-space.

65. The apparatus of claim 63, further comprising a first color setter for setting a color having a zero color-index equal to said region-color.

66. The apparatus of claim 63, further comprising a second color setter for setting a color having a maximal value color-index equal to the fill-color.

67. The apparatus of claim 63, wherein said mapping unit further comprises a first halting mechanism for writing a predetermined halting-color into a single cell, said single cell being a starting cell.

68. The apparatus of claim 67, wherein said predetermined halting-color is equal to said region-color.

69. The apparatus of claim 67, wherein said mapping unit further comprises a cell sealer for writing a color other than said region-color into at least one cell neighboring said starting cell, thereby to provide at least one sealed cell.

70. The apparatus of claim 69, wherein said agent further comprises a memory for storing a relative direction of each said sealed cell with respect to said starting cell.

71. The apparatus of claim 70, wherein said means for determining comprises a color detector for determining an existing color-index of each said elementary-region.

72. The apparatus of claim 71, wherein said mapping unit further comprises an electronic-calculating functionality for increasing by 1 said existing color-index prior to exiting of said agent from said elementary-region.

73. The apparatus of claim 53, wherein said dividing unit comprises a joining unit for forming a plurality of 2 by 2 squares of cells, thereby to provide said plurality of elementary-regions, each comprising a single said square of cells.

74. The apparatus of claim 73, wherein said color selected from said color-space comprises a color having an integer valued color-index, said integer value ranging from 0 to a maximal value.

75. The apparatus of claim 74, wherein said maximal value is smaller by one than a size of said color-space.

76. The apparatus of claim 74, wherein said filling unit further comprises a characterizer, for characterizing each elementary-region by an entry axis and a flip symmetry with respect to said entry axis.

77. The apparatus of claim 76, wherein said mapping unit further comprises a second color selector for selecting an information color, in accordance with both said entry axis and said flip symmetry.

78. The apparatus of claim 77, wherein said mapping unit further comprises a cell selector for selecting at least one cell for storing said information color data thereby to mark an entry-exit direction.

79. The apparatus of claim 74, wherein said mapping unit further comprises a second halting mechanism for writing a predetermined halting-color into all cells occupying a predetermined elementary-region, said predetermined elementary-region being a starting elementary-region.

80. The apparatus of claim 79, wherein said predetermined halting-color is equal to said bounda ry-color.

81. The apparatus of claim 79, wherein said starting elementary-region comprises at least two region-cells.

* * * * *